United States Patent Office 3,078,590
Patented Feb. 26, 1963

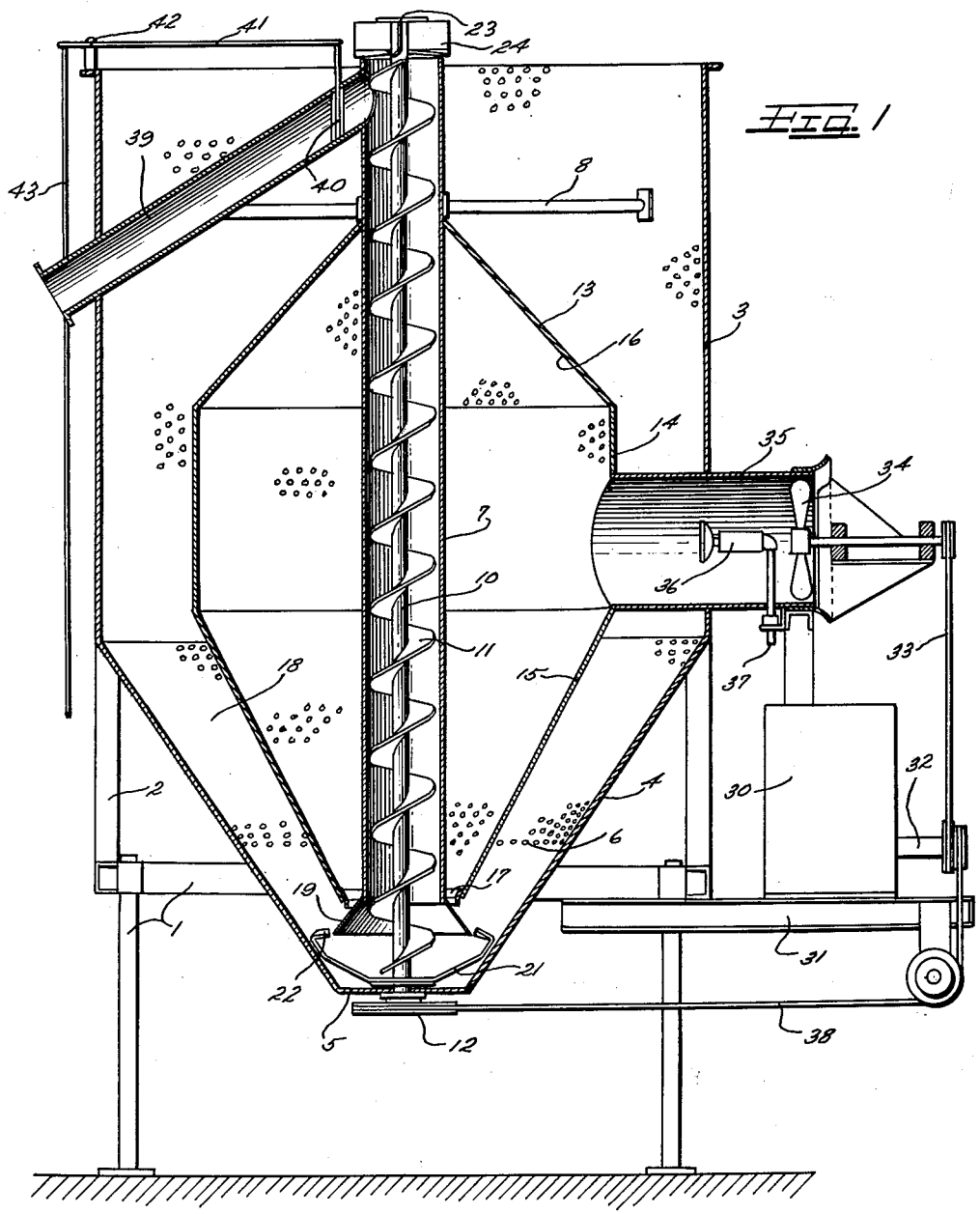

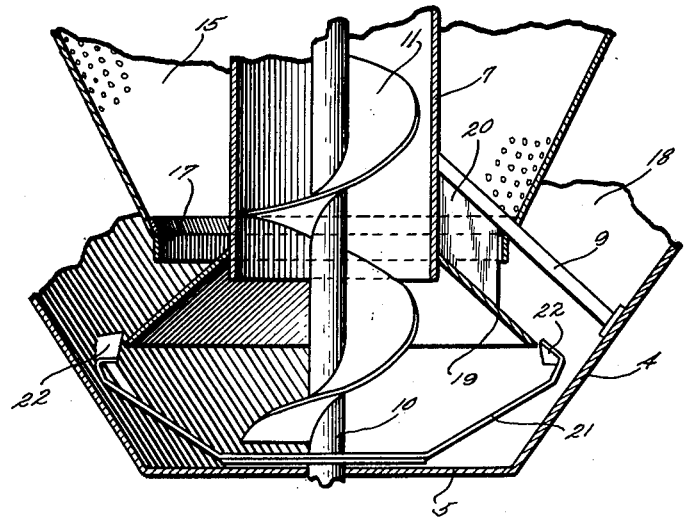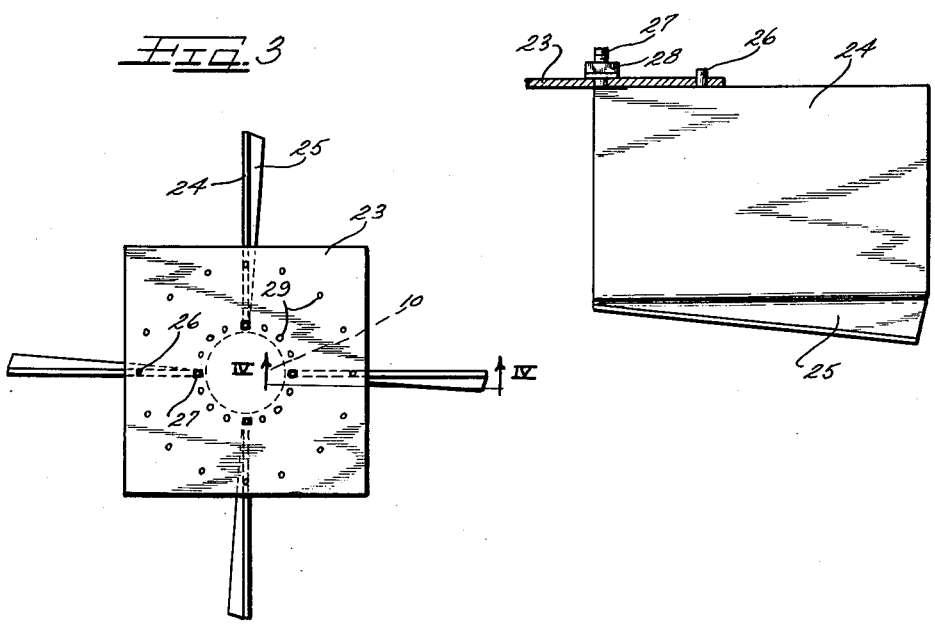

3,078,590
GRAIN DRYER
Elmo L. Batterton, Morton, and Melvin J. Lousdale, Princeville, Ill., assignors to A. F. Meyer Mfg. Co., Morton, Ill., a corporation of Illinois
Filed June 27, 1960, Ser. No. 39,026
5 Claims. (Cl. 34—102)

This invention relates to improvements in a grain dryer, and more particularly to a drying mechanism or apparatus for removing moisture to a desired extent from shell corn, milo, wheat, barley, oats, soybeans, and various other grains and the like, although the invention may have other uses and purposes as will be apparent to one skilled in the art.

Briefly, the instant invention relates to a grain dryer in which the grain is kept in continuous motion by a means of a vertical auger which elevates the grain through a tube, discharging the same at the top into a tank or bin surrounding an inner housing associated with the auger tube to form a plenum chamber, the grain descending in the passage between the inner housing and the outer bin or tank to the bottom and then is again elevated by the auger. This process continues until the grain has reached a desired state of dryness.

Devices of the character just above mentioned are deemed most efficient because of more thorough drying.

However, extreme difficulty has been experienced in the past, even with dryers having a central elevating auger, because the grain could not be kept moving continuously and uniformly at slower speeds so as to provide a gentle handling of the grain, and in devices of this character heretofore known in most cases the grain tended to channel or stratify that is a layer of dryer grain adjacent the outside of the grain passage would begin moving faster than a layer of wetter grain adjacent the inside of the same passage, and sometimes the wetter grain would become stationary. This condition became aggravated in that the dryer grain became even more dry while the wetter and slower or stationary portion of the grain became wetter. In addition it may be mentioned that in every instance of which we are aware formerly known grain dryers utilizing a plenum chamber had a chamber with a flat bottom terminating well above the lower end of the auger with a conical formation on the outside bin or tank to feed grain toward the auger by virtue of gravity. Such an arrangement results in uneven feeding, resulting in channeling or stratifying of the grain and consequently a non-uniform flow of grain with non-uniform drying. In other instances, previously known devices of this character utilizing a central vertical auger to elevate the grain permitted the grain merely to be extruded or "bubble" out of the top of the auger tube which is of considerably less diameter than the bin or tank, with the result that the grain would pyramid immediately adjacent the auger tube, adding weight to the central portion of the grain thus causing a faster flow or descent of grain immediately adjacent the auger tube than adjacent the inner face of the bin itself, this being channeling or stratification reversed to that discussed above. Nevertheless, any stratification of the grain during its movement or cycling circulation through the dryer is undesirable and adversely affects the likelihood of acquiring uniform drying of all the grain.

Further, it may be mentioned that grain dryers heretofore developed were in many cases uneconomical to operate either because a relatively large heating assembly and motor were required, or because of the length of time required to effectively dry a bin full of grain, or both.

With the foregoing in mind, it is an important object of the instant invention to provide a grain dryer that overcomes all the above mentioned defects and objections.

Another object of this invention is the provision of a grain dryer incorporating a plenum chamber having a lower portion sloping inwardly to a point immediately adjacent the lower end of the auger tube.

Also an object of this invention is the provision of a grain dryer having a central elevating auger, and wherein there is a combination gravity and force feed of grain to the lower end of the auger.

Still a further feature of the instant invention resides in the provision of a grain dryer having a central elevating auger, and wherein the grain path leading to the auger is narrowed adjacent the end of the auger so that virtually all of the grain ultimately comes in contact with an auger feeder that is power driven whereby the grain is not only kept uniformly in continuous motion, but circulates uniformly through the dryer even at a relatively slow speed of operation.

Also a feature of this invention is the provision of a grain dryer having a central elevating auger with automatic grain distributing means at the top of the auger tube whereby the grain circulating through the dryer is evenly distributed between the top of the auger tube and the outer bin or tank.

Still a further object of the instant invention resides in the provision of a grain dryer that is highly efficient in operation and extremely economical to both construct and operate, by virtue of the use of a relatively small heating assembly, a relatively small driving motor, and the fact that the grain remains within the dryer a relatively short time to become uniformly dried.

While some of the more salient features, characteristics and advantages of the instant invention have been above pointed out, others will become apparent from the following disclosures, taken in conjunction with the accompanying drawings, in which:

FIGURE 1 is a central vertical sectional view, with parts shown in elevation, of a grain dryer embodying principles of the instant invention;

FIGURE 2 is an enlarged fragmentary vertical sectional view, this figure being an enlargement of the lower central portion of FIGURE 1;

FIGURE 3 is a top plan view of the distributor head at the top of the auger tube, with other parts of the structure omitted; and FIGURE 4 is a fragmentary transverse sectional view of the distributor head taken substantially as indicated by line IV—IV of FIGURE 3, illustrating one of the distributing head blades in side elevation.

As shown on the drawings:

In the illustrated embodiment of the instant invention there is shown a grain dryer embodying an underframe or ground support 1 which is diagrammatically illustrated, since it may be made mobile in a known manner, if so desired. On the underframe 1 a plurality of uprights 2 lend support to an outer tank or bin 3, preferably having an open top. This bin 3 in its upper region is cylindrical, and therebelow is provided with a conical portion 4 terminating in a flat bottomed apical portion as indicated at 5. This bin 3 is preferably provided with numerous perforations throughout its surface above the point indicated at 6, and is preferably imperforate therebelow. The perforations are preferably of a size to prevent the smallest kernel or seed for which the dryer will be used from sticking in or passing through any perforation.

The bin 3 may be supplied with grain to be dried through the open top thereof, or the bottom 5 may be made in the form of a slide, and the grain fed by way of a suitable conveyor through the bottom opening, the particular method of filling the bin not being involved in the instant invention.

Centrally disposed inside the bin is a closed auger tube 7 which extends to a point adjacent the top of the bin, and terminates at its lower end approximately equidistant from the sloping sidewall 4 and the bottom 5 of the bin. This tube may be maintained in position by a number of suitable brace rods 8 welded or equivalently secured to both the tube and the bin adjacent the top of the tube, and by a number of rods 9, FIGURE 2, similarly mounted adjacent the bottom of the tube. Obviously, brace rods of such character may be utilized within the bin wherever deemed necessary to support the various interior parts of the dryer.

Inside the tube 7 which is open at both the upper and lower ends is an auger comprising a shaft 10 with a serpentine or helical blade 11 therearound, which auger elevates grain through the tube 7. The lower end of the auger shaft 10 extends through a suitable opening in the bottom 5 and is connected to a drive pulley 12 outside the bin or to any suitable form of gearing.

Around the auger tube 7 is an inner housing or partition including an inverted conical upper portion 13, an intermediate cylindrical portion 14, and a lower conical portion 15. This entire housing is provided with numerous perforations, similar to those in the outer tank wall, throughout, and the inside housing forms with the auger tube a plenum chamber 16. The upper end of the inner housing is connected tightly around the auger tube, while the lower end terminates in an attached flanged ring 17 of a greater diameter than the auger tube to provide a narrow annular space therebetween for the elimination of dust and the like that may accumulate within the plenum tube and which, if permitted to accumulate might cause an explosion or fire. The ring 17 is connected to the lower brace rods 9 for adequate support.

The plenum chamber housing is of course spaced inwardly from the outer tank wall to provide a path 18 therebetween through which the grain gravitates in the course of its movement within the dryer. The inverted conical upper portion 13 of the plenum chamber housing gives the grain an easy gravitational start toward the narrower passage between the cylindrical portion 14 and the outer tank. It will be noted that the lower conical portion 15 of the plenum chamber housing tapers at a steeper angle than does the conical portion 4 of the outer tank or bin so that the passage therebetween gradually narrows downwardly so that the lower end of this passage is substantially half the width of the upper end. It will also be noted that the conical portion 15 of the plenum chamber housing starts to taper slightly above the conical portion 4 of the outer tank and the steeper taper of the part 15 insures a steady and even flow of grain.

At the lower end thereof the auger tube is provided with a downwardly and outwardly flaring annular baffle 19 which may be retained in position by a series of plates 20, FIGURE 2, connected to the brace rods 9. This baffle functions as a deflector, urging the moving grain outwardly toward the portion 4 of the outer tank where the grain must pass through a narrower passage between the deflector edge and the tank wall. At this point, the moving grain is force fed to the lower end of the auger by means of a rotary auger feeder 21 connected to the auger shaft for rotation therewith. This auger feeder comprises opposed arms each of which is provided at its upper and outer end with a bent formation or plow 22 shaped to deflect grain inwardly toward the lower end of the auger. It will be especially noted from the showing in FIGURES 1 and 2 that the plows 22—22 project slightly above and outwardly of the lower end of the deflector baffle 19 so that the moving grain is actually engaged by the plows as it is about to enter the most restricted portion of the passage between the lower edge of the deflector and the outer tank wall 4. It will also be noted that the deflector 19 and the auger feeder are within the lower imperforate portion of the outer tank wall so that the grain only contacts a smooth surface at the time it is force fed to the auger and there is no possibility of grinding or abrading the grain against any sharp edges on a perforated wall when it is forcefully moved, and the grain remains whole and clean in its natural state.

The main advantage of the deflector baffle 19 is that all of the grain is fed to the auger. If the baffle were not there the auger would be partially self-fed by gravity, notwithstanding the feeder 21, and there would be opportunity for wet grain to lodge adjacent the lower end of the plenum wall 15 while dryer grain adjacent the outer tank wall 4 could move thereby, resulting in stratification or uneven feeding of the grain to the auger. Such disadvantage is entirely eliminated by way of the baffle and the association therewith of the feeder with the plow ends 22—22.

In order to insure an even distribution of the grain elevated by the auger at the top of the outer tank 3, and avoid any possible pyramiding of the grain adjacent the auger tube, the auger shaft is provided with a rotary distributor head. This head, as best seen in FIGURES 3 and 4, embodies a plate 23 fastened to the top of the auger shaft 10 which extends above the top of the outer tank or bin. Depending from the underside of the plate is a plurality of spaced radially extending vanes 24, each of which has a bent and tapering lower portion 25 shaped to deflect the grain outwardly. In the illustrated instance there are four such vanes disclosed, but any other suitable number may be utilized. Each vane may be provided with a pair of spaced upstanding pins 26 and 27, at least one of which is preferably threaded to accommodate a nut 28 above the plate 23. These pins extend through sets of radially aligned apertures 29 in the plate, and it will be noted from the showing in FIGURE 3 that the plate is preferably provided with a number of pairs of apertures 29 so that the vanes may be adjusted or positioned at various desired angles depending upon the particular grain being dried.

It will be noted from the showing in FIGURE 1, that the vanes 24 extend outwardly beyond the auger tube 7 and all of the grain that is elevated by the auger comes in contact with the vanes rotating on the auger shaft so that the grain is evenly distributed over the entire top of the tank 3 not only providing an even distribution of weight, but also providing what may be termed an even blending of the grain. Stratification or channeling cannot result at the upper portion of the auger tube as it probably would in the event the grain were permitted to merely flow over the upper end of the tube without being distributed by the vanes 24.

Of course, any suitable means are provided to deliver a draft of heated air for drying the grain and also to drive the auger shaft 10. Such means are somewhat diagrammatically illustrated in the drawing and comprise an internal combustion engine 30 mounted on a side frame 31 which through its shaft 32 and a suitable belt and pulley connection 33 or the equivalent drives a blower fan 34 mounted in a conduit 35 which extends through both the inner and outer walls and discharges into the plenum chamber 16. Also disposed in the conduit 35 is a suitable burner 36 to which fuel may be admitted from any suitable source through a pipe 37 which heats the air driven inwardly by the fan 34. Obviously any form of controls may be provided to insure a desired air temperature depending upon what grain is being dried. The hot air passes outwardly from the plenum chamber through the perforations in the walls 13, 14 and 15, through the grain in the passage 18 between the plenum wall and the outer tank wall and exits through the perforations in the outer tank.

Any suitable form of drive connection from the motor 30 to the auger shaft 10 may be utilized, and we have diagrammatically shown a belt and pulley assembly 38 for this purpose.

After the grain has been circulated through the dryer until it has reached the desired state of dryness, it may be discharged through a chute 39 having its inner end opening into the auger tube and its outer end extending through the outer tank wall. A slide valve 40 is disposed in the chute 39 and is pivotally connected to a rod 41 pivoted to the outer tank wall at 42, with a pull rod 43 depending from the outer end thereof. By actuation of the rod 43, the slide valve 40 may be opened or closed when desired.

In operation, the instant invention is highly efficient. After the tank or bin 3 has been filled with grain, the engine 30 is started, and the grain descends uniformly through the passage 18, is fed by the feeder to the lower end of the auger, elevated by the auger through the tube 7, and distributed evenly by the distributor head including the vanes 24 at the top of the auger shaft over the grain at the top of the tank. In this manner, there is a smooth, even and continuous flow of the grain, without channeling or stratification, and the flow is even and smooth even at relatively slow speeds. The heated air passes readily through the moving grain, there is relatively low static pressure, and consequently lower power requirements. The grain is uninjured even though there is a combination gravity and force feed to the lower end of the auger, and with such feed all of the grain is maintained in uniform motion. The grain is uniformly dried in a relatively short time since there is an even wall of flowing grain around the plenum chamber housing. Moreover, the dryer is economical to manufacture and use, and is extremely long lived.

It will be understood that modifications and variations may be effected without departing from the scope of the novel concepts of the present invention.

We claim as our invention:

1. In a grain dryer, an outer tank having a conical lower portion terminating in a flat bottom, an upstanding auger tube having open ends centrally disposed in said tank above said flat bottom, an auger in said tube to elevate grain therethrough, a housing forming a plenum chamber around said tube, said housing having an inverted conical upper portion, a cylindrical intermediate portion and a conical lower portion, said housing being spaced from said tank to provide a grain passage therebetween, said housing and said tank both having numerous perforations therein, a deflector baffle at the lower end of said auger tube narrowing the grain passage at this point, an auger feeder comprising opposed arms having plow-shaped ends mounted for rotation adjacent the lower end of said deflector baffle, a distributor head connected to said auger at the top thereof for rotation therewith to distribute grain evenly in the outer tank above said plenum chamber housing, means to drive said auger, means to discharge heated air into said plenum chamber, and means for discharging grain from said tank.

2. In a grain dryer, an outer perforated tank, an upright tube centrally disposed in said tank, an auger including a shaft and blade in said tube to elevate grain therethrough, a housing forming with said tube a plenum chamber and with said tank a grain passage between said housing and tank, said passage sloping inwardly and downwardly towards the lower end of said auger, a rotary feeder mounted on the shaft of said auger and comprising opposed arms and a plow-shaped formation on the free end of each arm to force grain from said passage toward the lower end of said auger, and means to rotate said auger shaft and said feeder.

3. In a grain dryer, an outer perforated tank, an upright tube centrally disposed in said tank, an auger including a shaft and blade in said tube to elevate grain therethrough, a housing forming with said tube a plenum chamber and with said tank a grain passage, the lower portion of said passage between the housing and tank sloping inwardly and downwardly towards the lower end of said auger, an outwardly and downwardly flaring baffle around the lower end of said auger tube to urge grain toward the part of said passage narrowed by said baffle, force feed means extending into said passage adjacent the edge of said baffle, and drive means to actuate said auger and said feed means.

4. In a grain dryer, an outer perforated tank, an upright tube centrally disposed in said tank, an auger including a shaft and blade in said tube to elevate grain therethrough, a perforated housing forming with said tube a plenum chamber and with said tank a grain passage, the lower portion of said passage between said housing and said tank sloping inwardly and downwardly and gradually narrowing toward the lower end of said auger to a bottom width approximately half the top width thereof, said lower portion of the passage being of a length at least six times the bottom width, an outwardly flaring baffle at the bottom of the auger tube with its lower portion extending partially across the bottom of said passage, mechanical grain feeding means adjacent the lower end of the auger, and drive means to actuate the auger and said feeding means whereby grain is fed to the auger by both gravity down said passage and forcefully by said feeding means.

5. In a grain dryer, a tank having an inwardly sloping lower portion terminating in a relatively small bottom, an upright tube in said tank above said bottom, an auger in said tube, a housing between said tube and tank forming a plenum chamber with said tube and a grain passage with said tank, said housing and said tank having numerous perforations therein, a rotary force feeder adjacent the tank bottom and the lower end of said auger, means to feed a heated gas into said plenum chamber, means to actuate said auger and said force feeder, the lower portion of said housing being conical but sloping steeper than the lower portion of said tank gradually narrowing the lower part of said passage to a bottom width approximately half the top width thereof, said lower passage part having a length at least six times the bottom width, an outwardly flaring baffle at the bottom of the auger tube with its lower portion extending partially across the bottom of said passage, and means for discharging grain from said tank.

References Cited in the file of this patent

UNITED STATES PATENTS

| 1,341,676 | Robert | June 1, 1920 |
| 1,711,574 | Miller | May 7, 1929 |
| 2,207,360 | Spellacy | July 9, 1940 |
| 2,634,513 | Ladd et al. | Apr. 14, 1953 |
| 2,902,816 | Rayner | Sept. 8, 1959 |
| 2,925,666 | Gilmore et al. | Feb. 23, 1960 |

FOREIGN PATENTS

| 11,946 | Great Britain | 1893 |
| 28,214 | Great Britain | 1907 |